United States Patent [19]
Kim

[11] Patent Number: 5,778,796
[45] Date of Patent: Jul. 14, 1998

[54] SWITCH SYSTEM FOR PERSONAL RAPID TRANSIT

[76] Inventor: In Ki Kim, 32-02 Hyosung Villa, #64 Chungdam-dong, Kangnam-gu, Seoul, Rep. of Korea, 135-100

[21] Appl. No.: 919,100

[22] Filed: Aug. 28, 1997

Related U.S. Application Data

[63] Continuation of Ser. No. 602,722, filed as PCT/KR94/00130, published as WO95/35221, Dec. 28, 1995, abandoned.

[30] Foreign Application Priority Data

Jun. 21, 1994 [KR] Rep. of Korea ............... 1994/14033

[51] Int. Cl.$^6$ ............................................. E01B 26/00
[52] U.S. Cl. ............... 104/130.07; 104/139; 104/293; 104/250
[58] Field of Search .................. 104/130.01, 130.02, 104/130.07, 139, 290, 293, 249, 250

[56] References Cited

U.S. PATENT DOCUMENTS

| | | | |
|---|---|---|---|
| 3,330,384 | 7/1967 | Bertin et al. | |
| 3,646,613 | 2/1972 | Matsumoto et al. | 104/130.08 |
| 3,791,308 | 2/1974 | Hartz | 104/139 |
| 3,869,990 | 3/1975 | Bertling | 104/130.02 |
| 3,874,299 | 4/1975 | Silva et al. | |
| 3,882,788 | 5/1975 | Simon et al. | 104/286 |
| 3,882,790 | 5/1975 | Winkle et al. | 104/290 |
| 3,901,160 | 8/1975 | Auer, Jr. | |
| 3,931,767 | 1/1976 | Karch | 104/130.02 |
| 4,061,089 | 12/1977 | Sawyer | |
| 4,665,830 | 5/1987 | Anderson et al. | 104/124 |
| 4,671,185 | 6/1987 | Anderson et al. | 104/130.07 |
| 4,819,564 | 4/1989 | Brandis et al. | 104/250 |
| 4,987,834 | 1/1991 | Peck, Jr. et al. | 104/300 |
| 5,033,394 | 7/1991 | Summa | 104/130.09 |
| 5,138,952 | 8/1992 | Low | 104/139 |

FOREIGN PATENT DOCUMENTS

| 2150245 | 4/1973 | Germany. |
|---|---|---|
| 2420245 | 10/1975 | Germany. |

OTHER PUBLICATIONS

"Physics, Part I and II: Third Edition", Halliday et al, Wiley and Sons Inc, pp. 770–774, 1978.

*Primary Examiner*—S. Joseph Morano
*Attorney, Agent, or Firm*—Stevens, Davis Miller & Mosher, L.L.P.

[57] ABSTRACT

An electromagnetic switching system for use in a Personal Rapid Transit (PRT) system having a personal rapid transit vehicle with an attached chassis operating over a network of interconnected guideways. The electromagnetic switching system comprises an electromagnetic switching unit mounted on each side of the chassis for directing the transit vehicle into a predetermined path at a switch section of the guideway. The electromagnetic switching unit has an electromagnet for exerting magnetic force on a continuous reaction rail which is attached to an internal sidewall of the guideway.

18 Claims, 13 Drawing Sheets

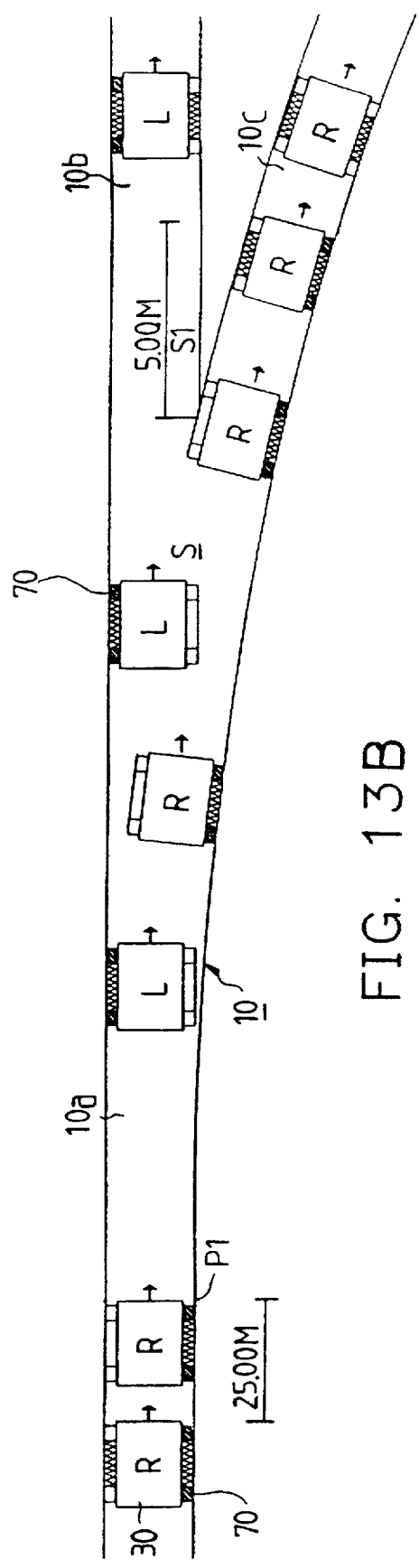
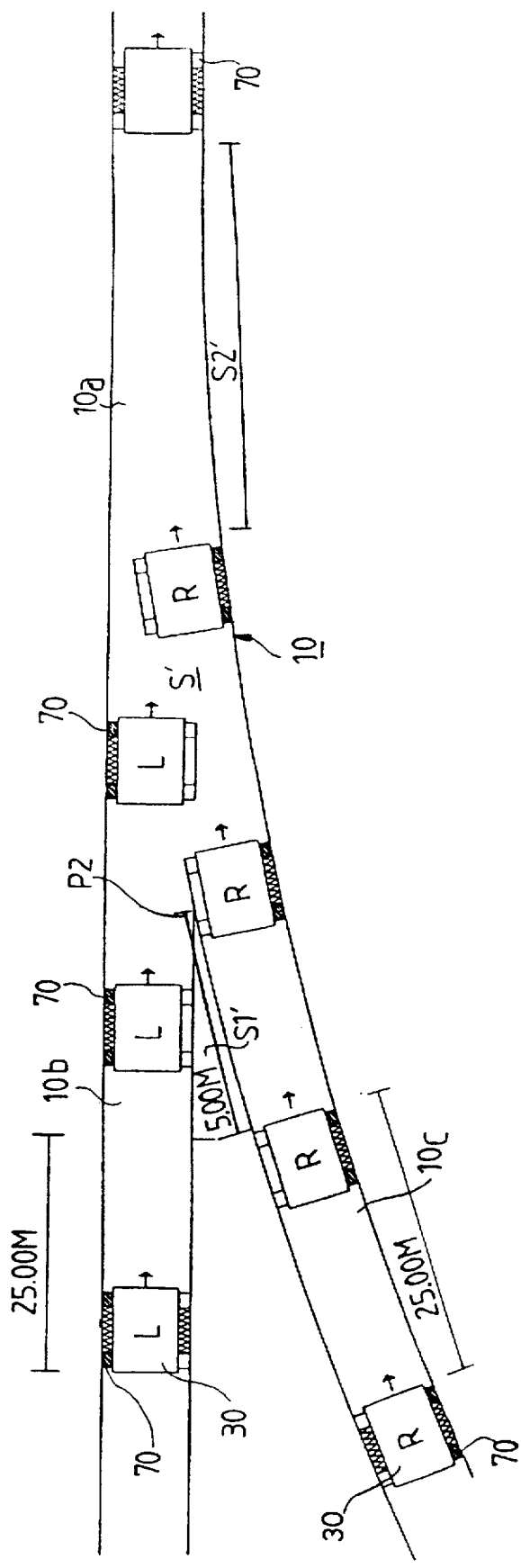
FIG. 13A
FIG. 13B

SWITCH SYSTEM FOR PERSONAL RAPID TRANSIT

This application is a continuation of application Ser. No. 08/602,722, filed as PCT/KR94/00130, Sep. 28, 1994 published as WO95/35221, Dec. 28, 1995, abandoned.

TECHNICAL FIELD

The present invention relates to a switch system for personal rapid transit which can offer passengers rapid arrival to destinations, and more particularly relates to a switch system for personal rapid, transit, by which small vehicles can travel to desired destinations without any moving parts at a diverging point and a merging point on the guideway.

BACKGROUND ART

Personal Rapid Transit (Hereinafter referred to as PRT) is a public transit system which offers passengers a non-stop direct origin to destination service in a small personal vehicle. The vehicles are fully automated and run on a small lightweight aerial guideway which can be located within streets or in buildings. Passengers do not need to share a run with strangers, and since most urban travel groups consist of three or less persons, the vehicle is equipped with three seats. The principal technical requirement of a commercially viable PRT system is that the vehicle flow capacity along a single guideway should be very high. To achieve vehicle flow rates of 6,000 vehicles per hour or more, running allocation of the vehicles in fractional second units is required. However, Monorails can not satisfy the above requirement since the entire section of beam in which the vehicles travel has to be moved into the other path to achieve switching, and then the path movement on the guideway requires a gap of time between vehicles in almost seconds. Since railways switch train direction by moving blades, they need about 30 to 45 seconds between trains taking different travel paths through the switch. Accordingly, the conventional system has drawbacks that running time of trains is delayed and switching to wrong directions results in derailment occurrence.

Disclosure of Invention

In order to solve the above problems, it is an object of the present invention to provide a switch system for personal rapid transit which can perform a switch operation on vehicles which travel in fractional second units through a diverging or merging point of a vehicle guideway.

Another object of the present invention is to provide a switch system for personal rapid transit which is capable of switching moving transit vehicles from one travel path to another without any moving parts on the guideway.

To accomplish the above objects, there is provided a switch system for personal rapid transit, the system comprising:

A guideway, composed of a straight main path, a switch section to be diverged and merged therefrom, including a predetermined vacancy for installing rails at the inside, a longitudinal slot located on the top center so that a vehicle support fin passes through, rails for travelling and reaction rails for reacting on an electromagnetic switch; small vehicles, including vehicle chassis equipped with guidance wheels inserted into the inside vacancy of the guideway on which the vehicle runs and an on-board portion connected to the vehicle chassis at the top of the guideway; and electromagnetic switch means, arranged at a predetermined location of the vehicle chassis, for controlling the small vehicle to travel into the preset direction responsive to the reaction rails of the guideway.

BRIEF DESCRIPTION OF DRAWINGS

FIGS. 13A and 13B are schematic diagrams illustrating travelling conditions of vehicles at a diverging point and a merging point in a switch system for personal rapid transit in accordance with the present invention.

BEST MODE FOR CARRYING OUT THE INVENTION

The preferred embodiment of a switch system for personal rapid transit in accordance with the present invention will be described in detail with reference to the accompanying drawings.

Figure 1:
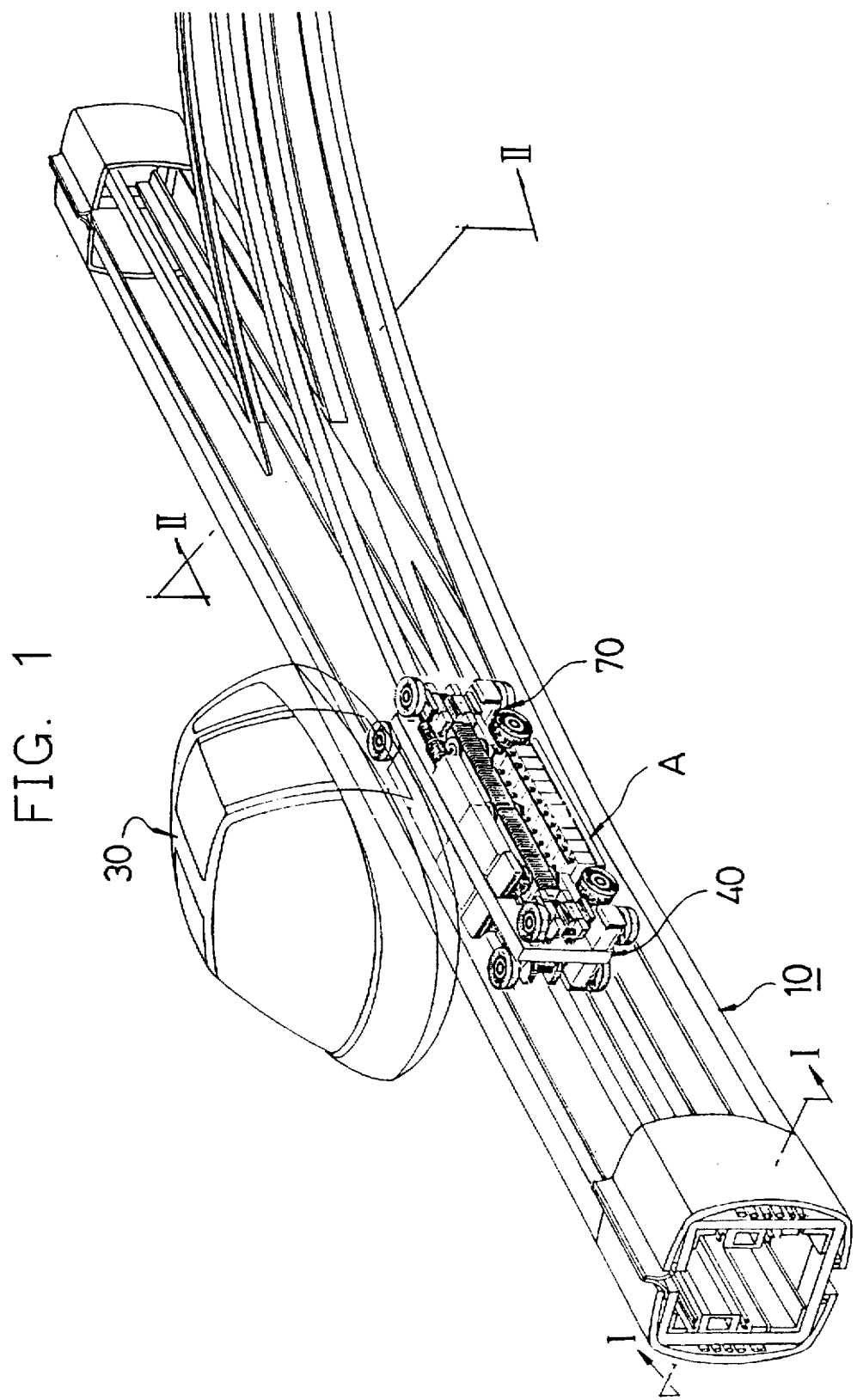
FIG. 1 is a cut-away perspective view of a switch system for personal rapid transit in accordance with the present invention.

FIG. 1 is a cut-away perspective view of a switch system for personal rapid transit in accordance with the present invention, which shows a switch section of a vehicle guideway through which vehicles pass.

As shown in FIG. 1, the switch system comprises a vehicle guideway 10, a small vehicle 30 which automatically travels along the vehicle guideway 10, including a vehicle chassis 40 to run inside the guideway 10, and an electromagnetic switching portion 70 which is capable of switching the small vehicle 30 in the vehicle guideway 10. Together they are integrated to form the PRT switch system. Detailed description to structures of each portion will be made below.

Figure 2:
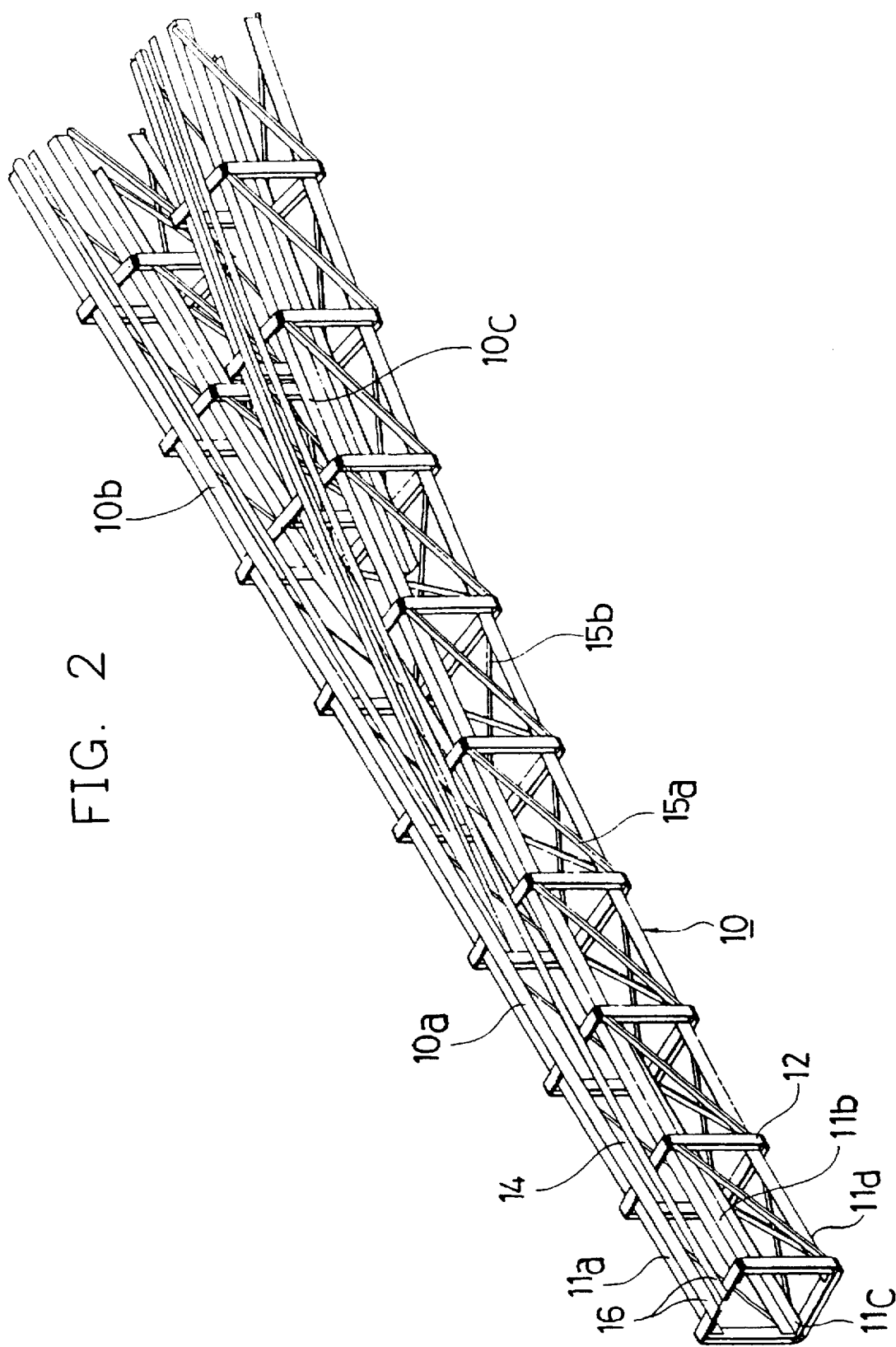
FIG. 2 is a perspective view showing a frame of vehicle guideway in a switch system for personal rapid transit in accordance with the present invention.

FIG. 2 is a perspective view showing a frame of the vehicle guideway shown in FIG. 1. The vehicle guideway 10 is aerial-installed in the network fashion in the downtown area and consists of a main path 10a and divergence paths 10b and 10c diverged from the main path 10a to a predetemined area. The vehicle guideway 10 is a steel box truss structure supported on columns at approximately 25 m intervals. Longitudinal structural angles 11a~11d are located at the four corners, and these also act as the support and guidance surfaces for the vehicle chassis 40 of the vehicle 30. The longitudinal structural and guidance angles 11a~11d are attached to lateral frames 12 at 1.6 m intervals. The frames 12 locate the running surfaces and also firmly support each of the longitudinal guidance angles 11a~11d so that any deformation including torsion of the guideway 10 does not happen.

The vehicle chassis 40 runs inside the box frame of the guideway 10 and the body of the vehicle 30 is supported on the chassis 40 by a narrow fin which projects above the guideway 10. Detailed structure will be described hereinafter.

The top of the guideway 10 has a continuous narrow slot 14 through which the body support fin passes. This slot 14 can normally reduce the torsional rigidity of the box structure. The lateral frames 12 made of very strong materials allow the slot dimensions to be fixed, and this provides adequate torsional rigidity. The box truss structure of the guideway 10 is braced by diagonal shear members 15a on the sides and by cross shear members 15b on the bottom, and the shear members 15a and 15b are attached to the lateral frames 12. The slot 14 on the top of the guideway 10 is framed by longitudinal angle members 16 arranged in the top center of the guideway 10, which act to support guideway covers described below.

Figure 3:
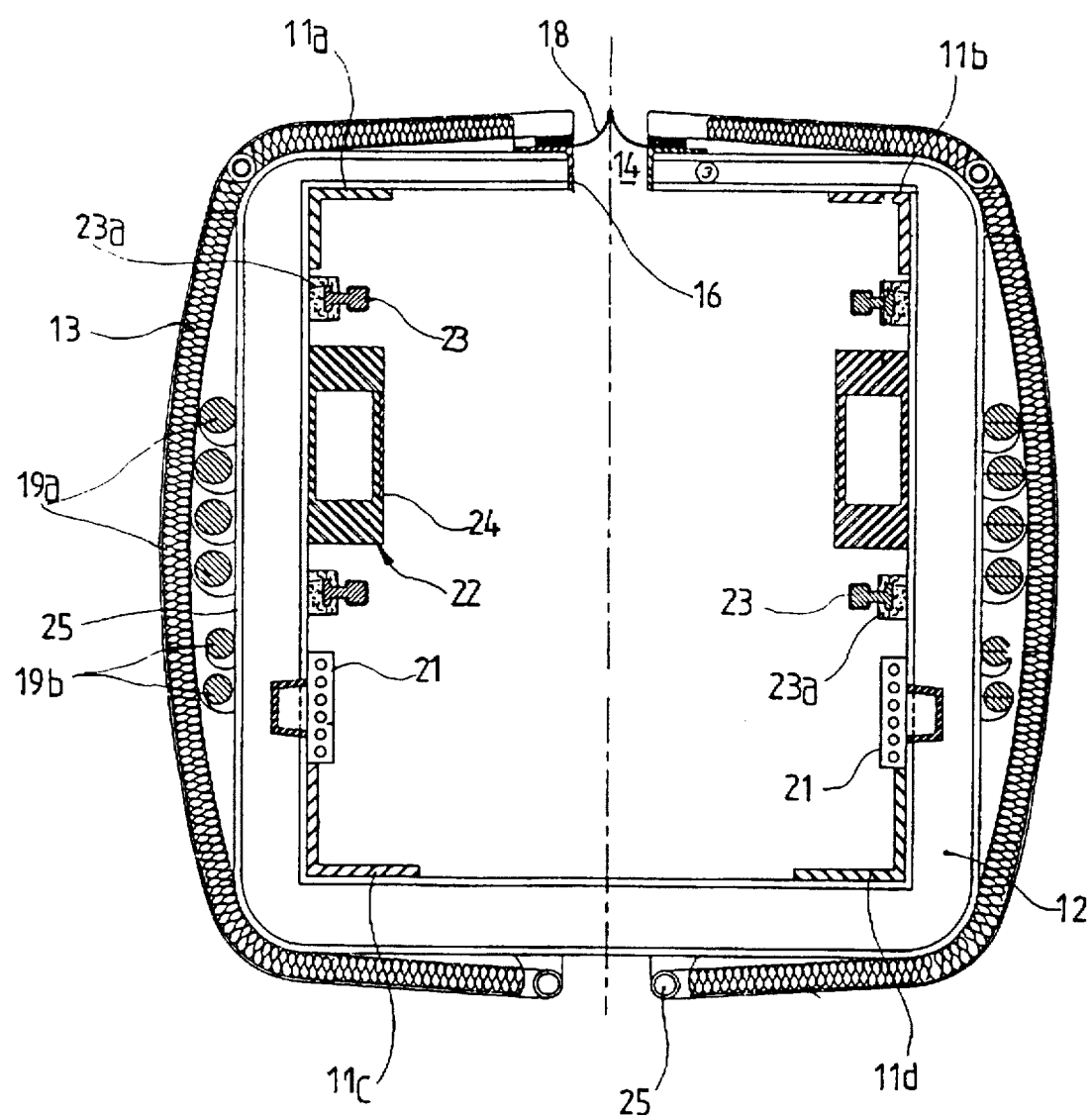
FIG. 3 is an enlarged sectional view taken along a line I—I of FIG. 1.

FIG. 3 is an enlarged sectional view taken along a line I—I of FIG. 1. The guidance angles 11a~11d are structural members forming the guideway 10 of the box structure. The lateral frames 12 locate running surfaces and act to provide torsional rigidity to the guideway 10. The slot 14 formed at the top center of the lateral frames 12 is sealed by a flexible cover strip 18 attached to the slot trim angles 16, through which the support fin of the vehicle 30 passes. The flexible cover strip 18 which seals the covers 13 and the slot 14 is mounted on the angle member 16 having the slot 14. One side of the covers 13 is fixed to the angle member 16 and the other is hinged to fold down at the bottom of the guideway 10, giving access for cleaning and maintenance of the guideway 10. The covers 13 are insulated to eliminate noise transmission and electromagnetic interference during travelling. Between the covers 13 and the lateral frames 12, electric power supply cables 19a and control and communication cables 19b are arranged. At the lateral frames 12 in the guideway 10, communication ducts 21 for receiving and transmitting all data information between the vehicle 30 and a controller are equipped. The electric power supply rails 23 which are mounted on insulators 23a are on either side of the inside lateral frames 12. Reaction rails 22 of the steel box are installed between the electric power supply rails 23. The reaction rails 22 are secondary components of a linear motor to provide propulsion and braking of the vehicle. The reaction rails 22 have an aluminum plate 24 that is rebated into the steel box opposite to the linear motor 44. The electric power supply cables 19a and control and communication cables 19b are supported by external cable racks at the outside of the lateral frames 12.

Figure 4:
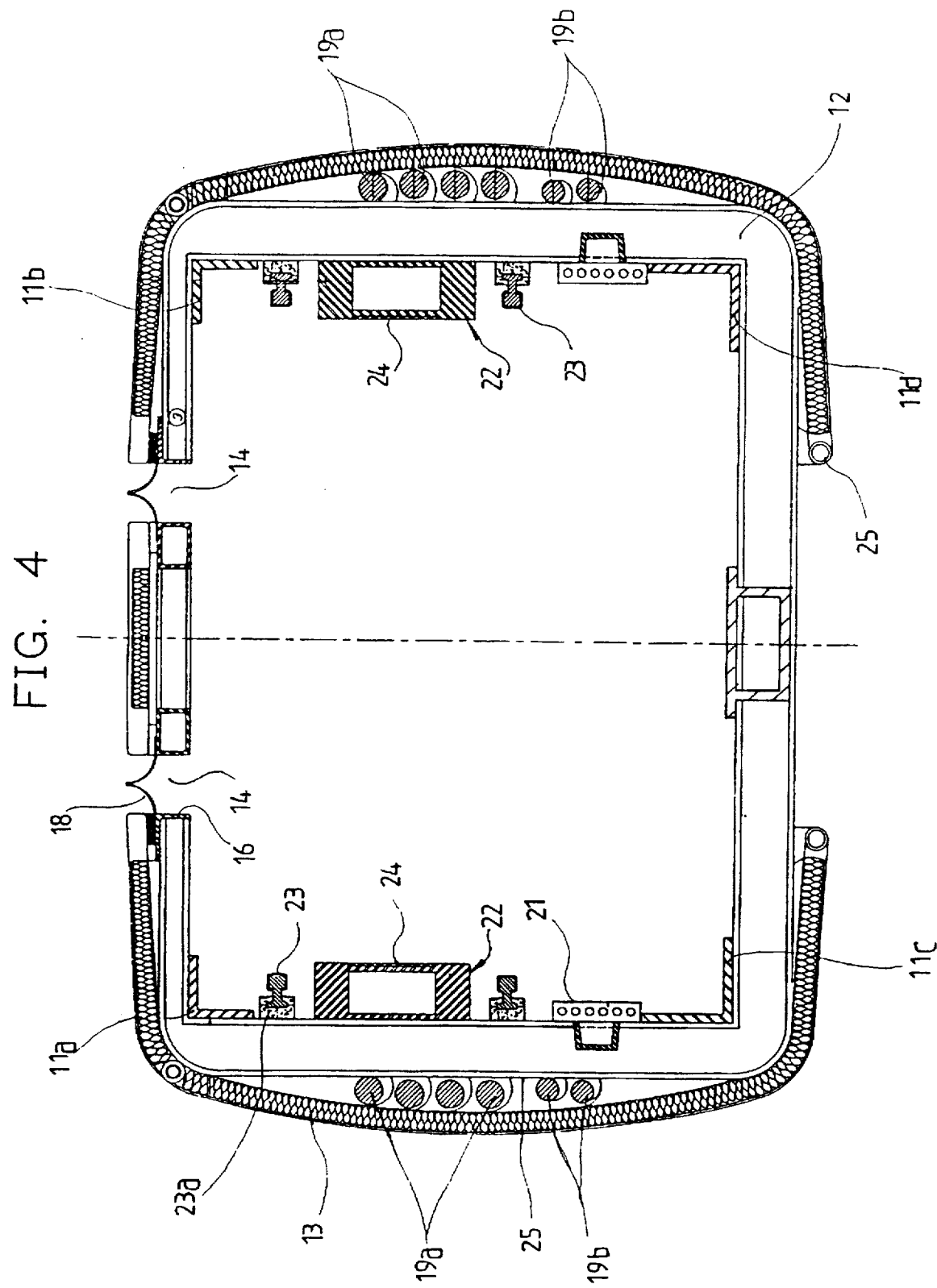
FIG. 4 is an enlarged sectional view taken along a line II—II of FIG. 1.

FIG. 4 is an enlarged sectional view taken along a line II—II of FIG. 1, which is a sectional view showing the divergence paths 10b and 10c of the guideway 10. The slots 14 in the guideway 10 through which the support fin of the vehicle body passes are installed at two sections, i.e., diverging and merging paths.

Figure 5:
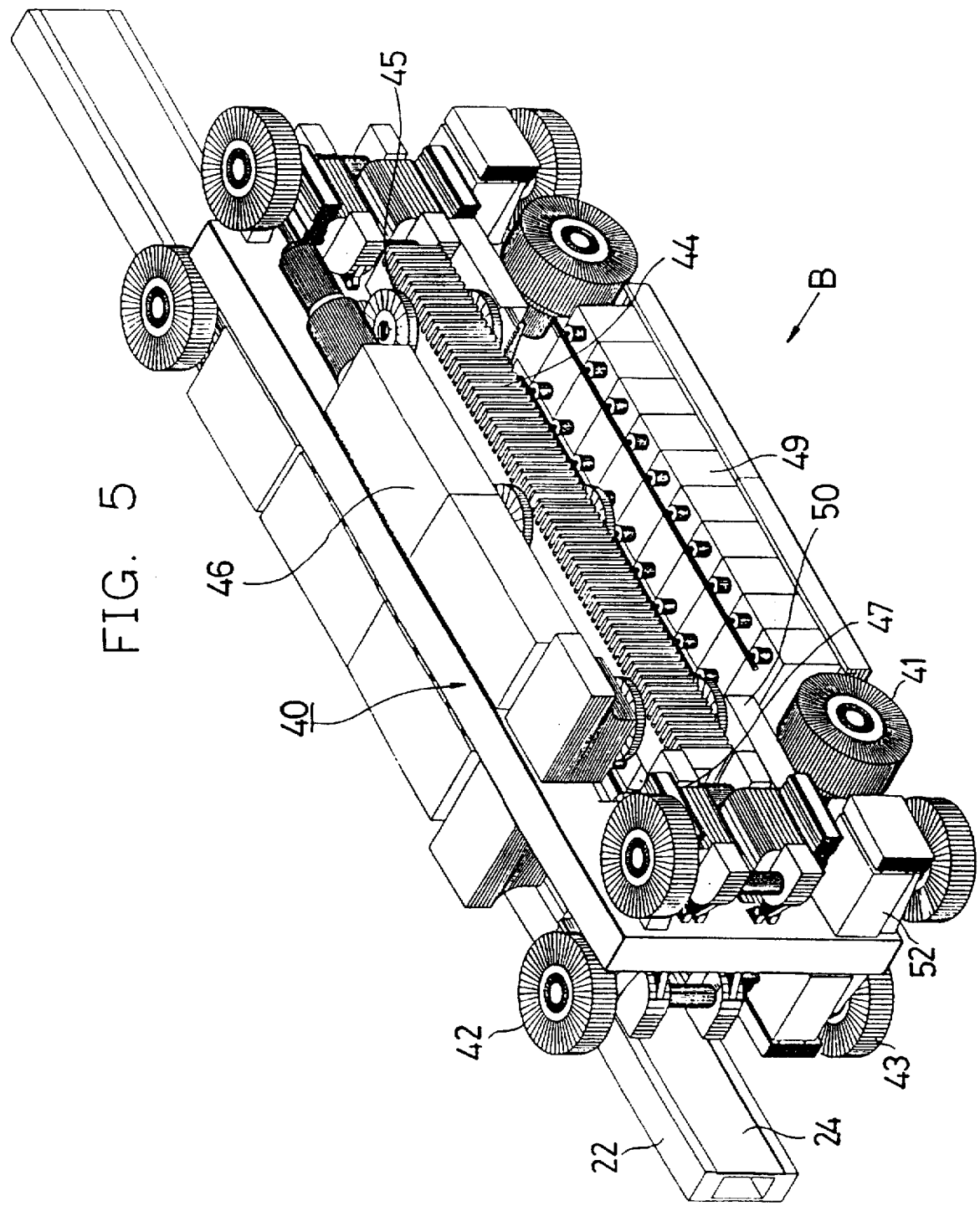
FIG. 5 is an enlarged perspective view illustrating only "A" portion of FIG. 1.
Figure 6:
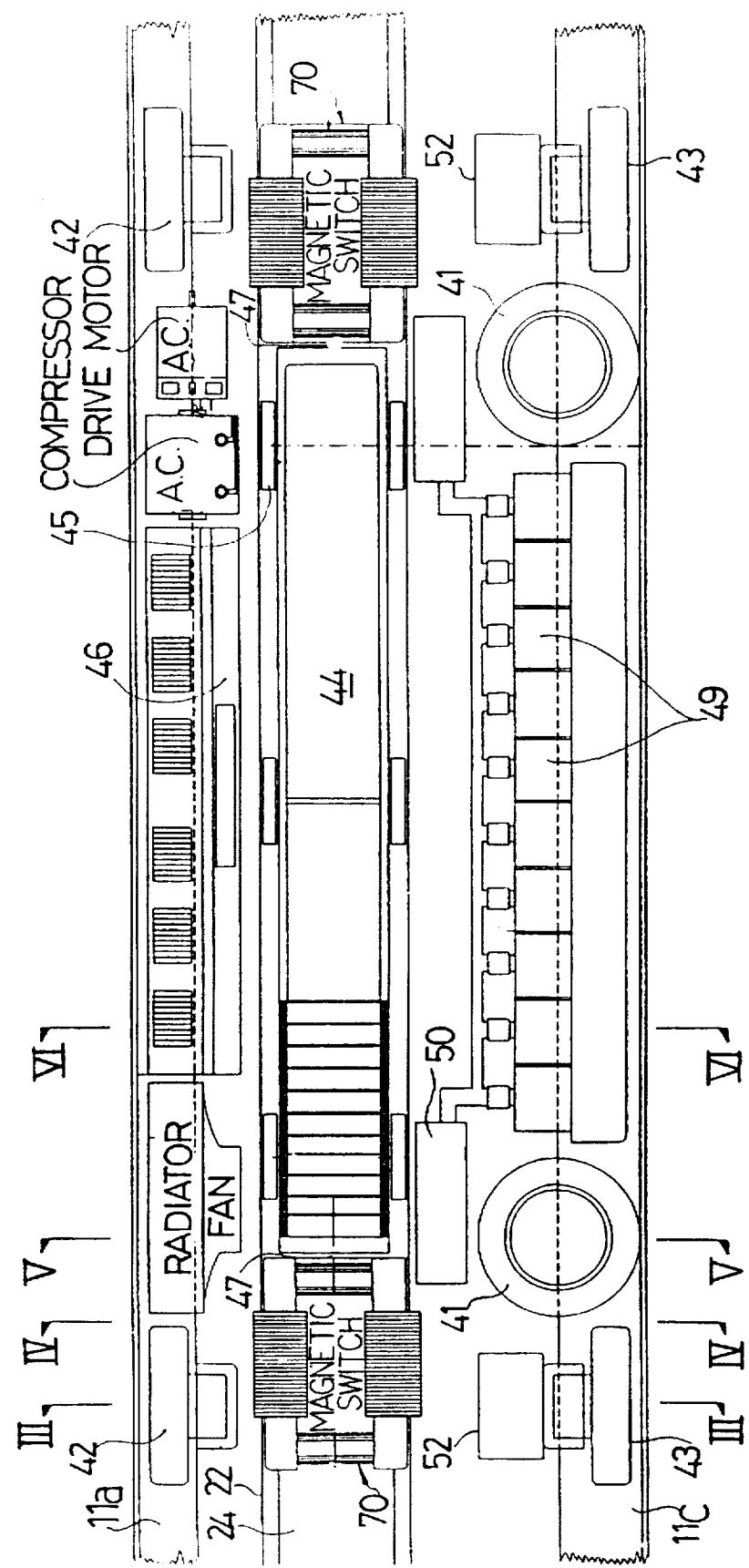
FIG. 6 is a side view shown in an arrow "B" direction of FIG. 5.

FIG. 5 is a perspective view showing the vehicle chassis of the vehicle applied to the switch system for personal rapid transit in accordance with the present invention, and FIG. 6 is a side view shown in an arrow "B" direction of FIG. 5. The vehicle chassis 40 is composed of a vertical box frame made of aluminum alloy. The vehicle chassis 40 is supported at the front and rear on vertically mounted aluminum alloy wheels 41 with polyurethane tires which give a smooth ride quality when running over the polished and lubricated high-nickel-steel running surfaces of the guidance angles 11a~11d. The vehicle chassis 40 is also supported at the front and rear, top and bottom by laterally mounted aluminum alloy wheels 42 and 43 with polyurethane tires which give a smooth guidance quality when running against the polished and lubricated high-nickel-steel running surfaces of the guidance angels 11a~11d. The support and guidance wheels 41-43 are slightly deformed under load but not enough to alter the geometric relationship of the chassis 40 to the guideway 10 by more than 3 mm in any axis.

The wheels 41-43 are smooth and running surfaces of the guidance angles 11a~11d of the guideway 10 are lightly lubricated in order to minimize rolling resistance and tire wear. All support and guidance wheels 41-43 can be adjusted for eventual tire wear up to 5 mm before tire replacement. The chassis 40 is propelled and braked under normal service conditions by linear induction motors 44 mounted on either side of the chassis 40. The motors 44 react against the steel box reaction rails 22 mounted laterally on either side of the guideway 10. The aluminum plate 24 of the reaction rails 22 is rebated into the steel box surface to improve conductivity for the induction motor. The linear motor 44 is articulated in two segments in order to minimize the variations in gap clearance when the vehicle 30 passes through sharply curved sections of the guideway 10 such as switch sections. The linear motor 44 is suspended by damped linkages which allow it to conform to curved surfaces. One of the important features of the linear motor 44 is that it generates a substantial attraction force to the reaction rails 22. In regular guideway 10 with both motors in operation the attraction forces tend to cancel each other out since the motors pull against the opposite walls of the guideway 10. In switch sections the linear motor 44 on the non-turnout side is switched off, while the linear motor 44 on the turnout side propels the vehicle 30. The attraction farce between the linear motor 44 and the reaction rails 22 of the guideway 10 assists in holding the vehicle 30 against the guideway wall as it passes through the switch. Upon leaving the switch section, the various components of the chassis 40 on the non-turnout side re-engage the guideway 10 smoothly.

In FIG. 6, reference number 45 is gap maintenance wheels, 46 is a variable voltage variable frequency (VVVF) inverter for motor control, 47 is articulation joint with electromagnetic switch, 49 is 20-12 VDC batteries arranged in series, 50 is battery chargers, and 52 is control and communication transmitter/receiver.

Figure 7:
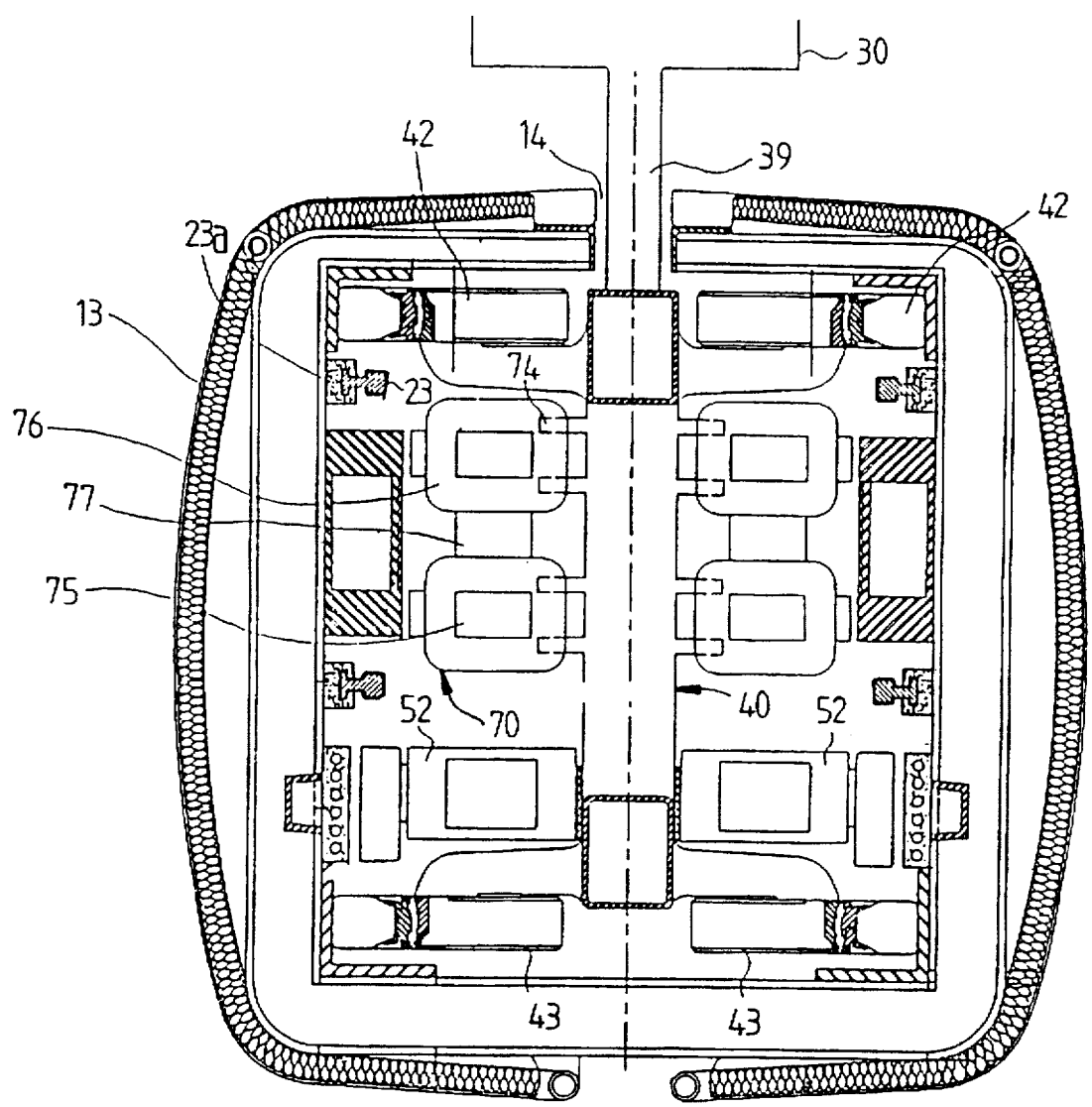
FIG. 7 is an enlarged sectional view taken along a line III—III of FIG. 6 illustrating a vehicle chassis mounted on a vehicle guideway.

FIG. 7 is an enlarged sectional view taken along a line III—III of FIG. 6 illustrating the vehicle chassis mounted on the vehicle guideway. Electromagnetic switches 70 are mounted onto the chassis 40 by flexible linkages 74. The linkages 74 allow a limited longitudinal movement and a limited rotation, but negligible lateral movement.

FIG. 7 also shows armatures 75 of the electromagnetic switches 70, winding coils 76 of the armatures 75 and connection tubes 77 between the upper and lower magnet armatures 75. From the chassis 40 a support fin 39 for supporting the vehicle body is installed to project above through the slot 14, and thus both chassis 40 and vehicle 30 are integrated to travel on the guideway 10.

Figure 8:
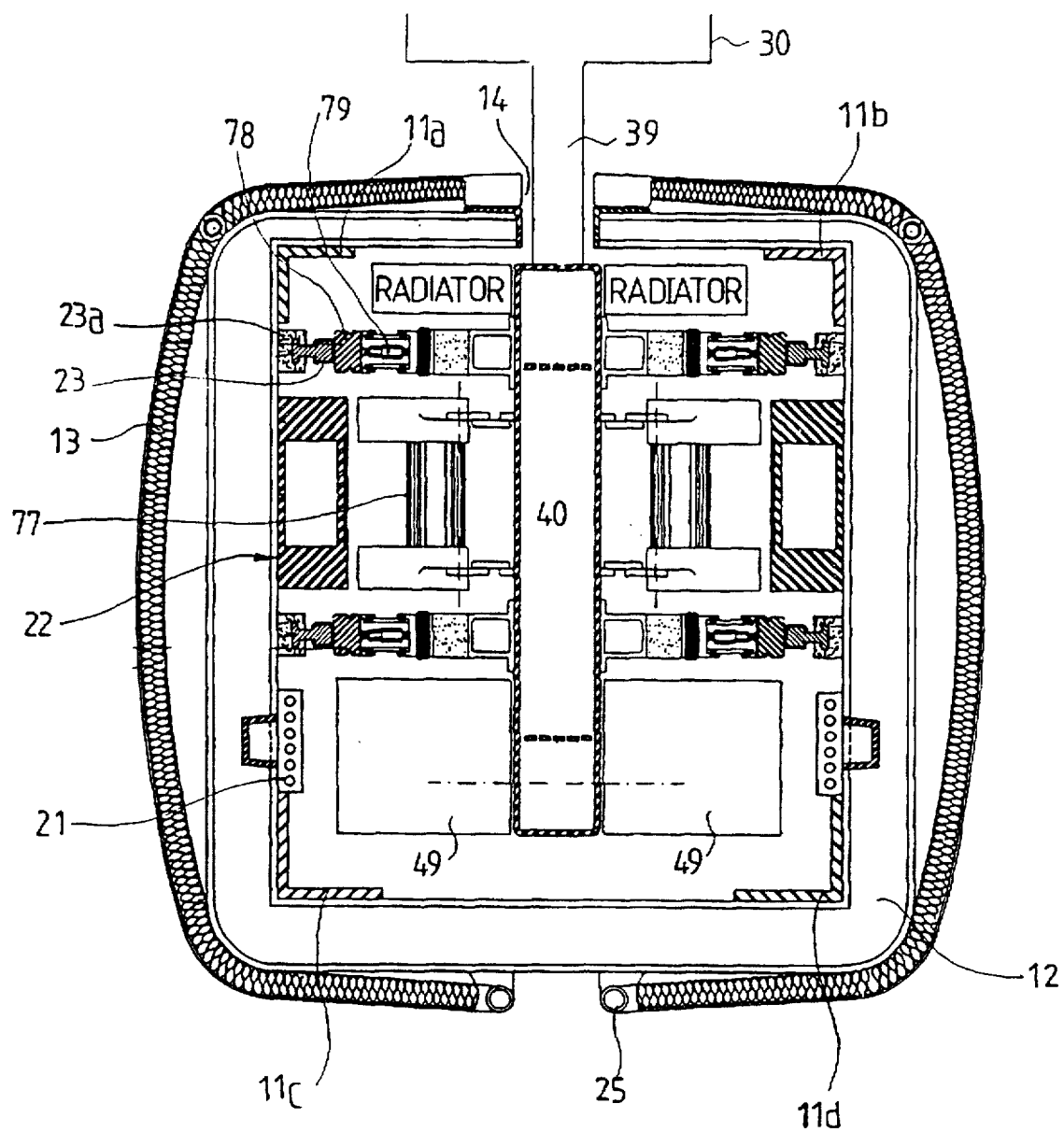
FIG. 8 is an enlarged sectional view taken along a line IV—IV of FIG. 6 illustrating a vehicle chassis mounted on a vehicle guideway.

FIG. 8 is an enlarged sectional view taken along a line IV—IV of FIG. 6 illustrating the vehicle chassis mounted on the vehicle guideway. Power collection shoes 78, which collect electric power to be supplied from the electric power supply rails 23 and provide the power to the vehicle 30, are connected to the PRT vehicle chassis 40. The power collection shoes 78 are connected to the chassis 40 by linkages 79 which accomodate relative movement between the chassis 40 and the guideway 10. The brushes on the power collection shoes 78 are wider than the power supply rails 23 to accomodate vertical differential movements. Reference number 49 shows a plurality of batteries, which will be illustrated in FIG. 12.

Figure 9:
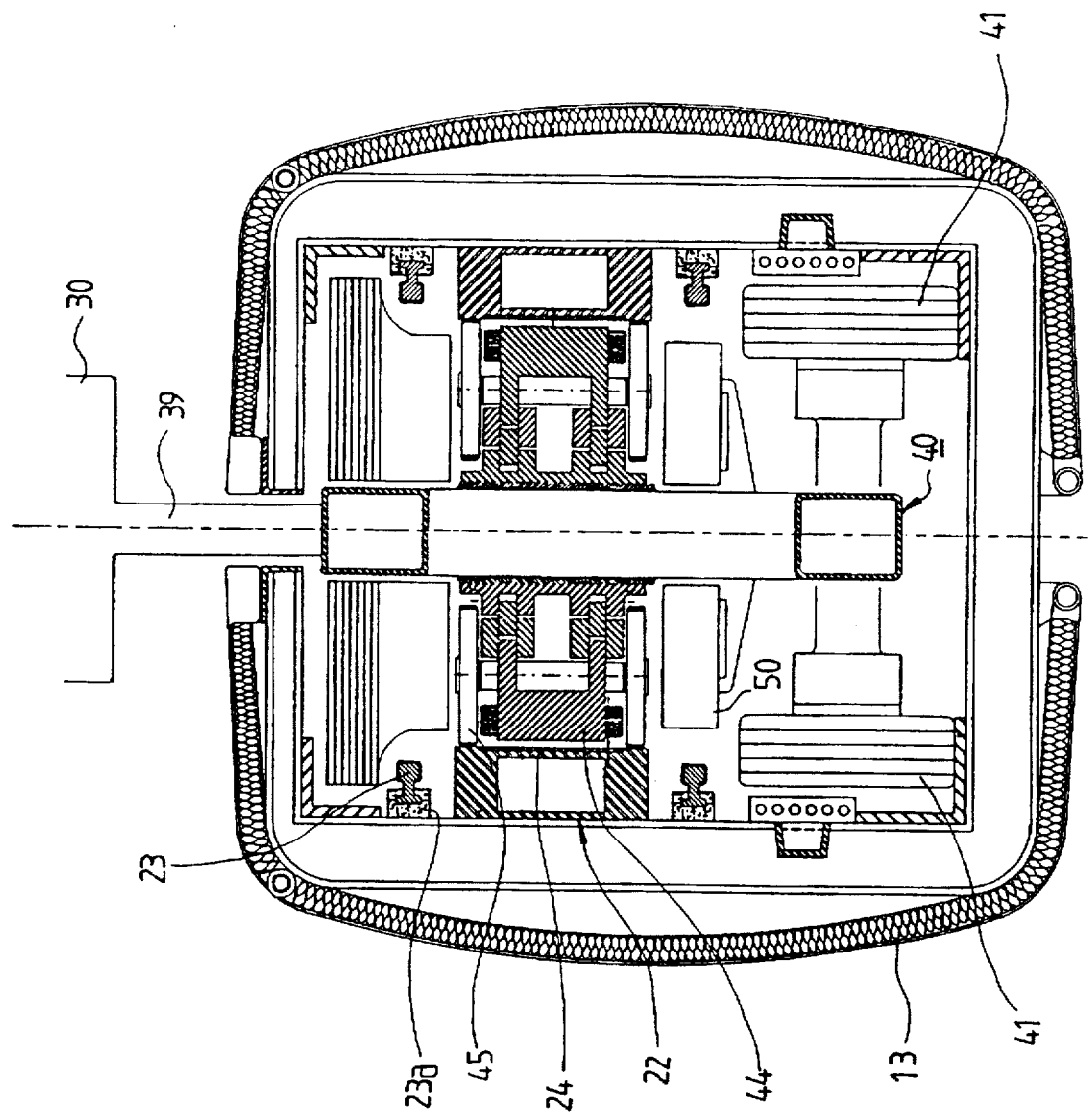
FIG. 9 is an enlarged sectional view taken along a line V—V of FIG. 6 illustrating a vehicle chassis mounted on a vehicle guideway.

FIG. 9 is an enlarged sectional view taken along a line V—V of FIG. 6 illustrating the vehicle chassis. The location of the linear motors 44 and the gap maintenance wheels 45 which run on the outer edges of the reaction rails 22 are shown. The vertical alignment of various components is maintained by vertical support and guidance wheels 41.

Figure 10:
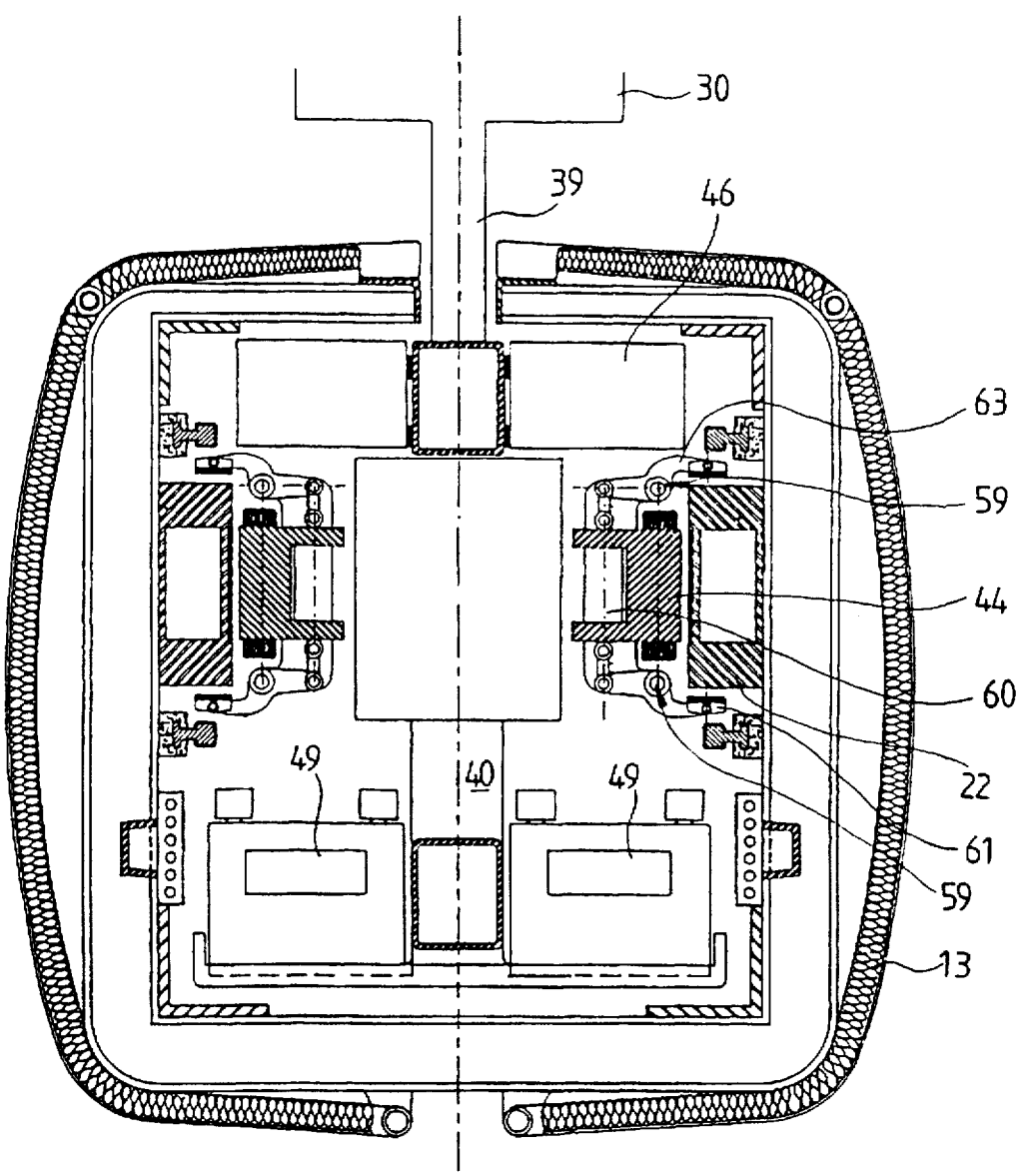
FIG. 10 is an enlarged sectional view taken along a line VI—VI of FIG. 6.

FIG. 10 is an enlarged sectional view taken along a line VI—VI of FIG. 6. Emergency/parking brakes 59 are mounted on the armatures of the linear motors 44. The emergency/parking brakes 59 are held open by a hydraulically actuated jack 60, which operates the brake linkages 63. In the event of a complete power failure in the vehicle 30 the brakes 59 would be automatically released at a rate designed to produce a deceleration of 5 m/sec$^2$. The brake pads 61 act on the sides of the reaction rail 22 which has a roughened surface. The emergency/parking brakes 59 are designed to be fully operable as the vehicle 30 passes through a switch section of the guideway 10. The brake 59 is fully functional when operated on only one reaction rail 22. When the vehicle 30 passes through a switch section, the brake 59 on the non-engaged side of the vehicle 30 will not actuate. This prevents any possibility of the brake jamming at a merging/ diverging point of the switch. When the vehicle 30 is not in use or is stopped at a station, the brakes 59 are applied after the vehicle 30 is fully stopped by the linear motors 44. In this way there is no real brake wear.

Figure 11:
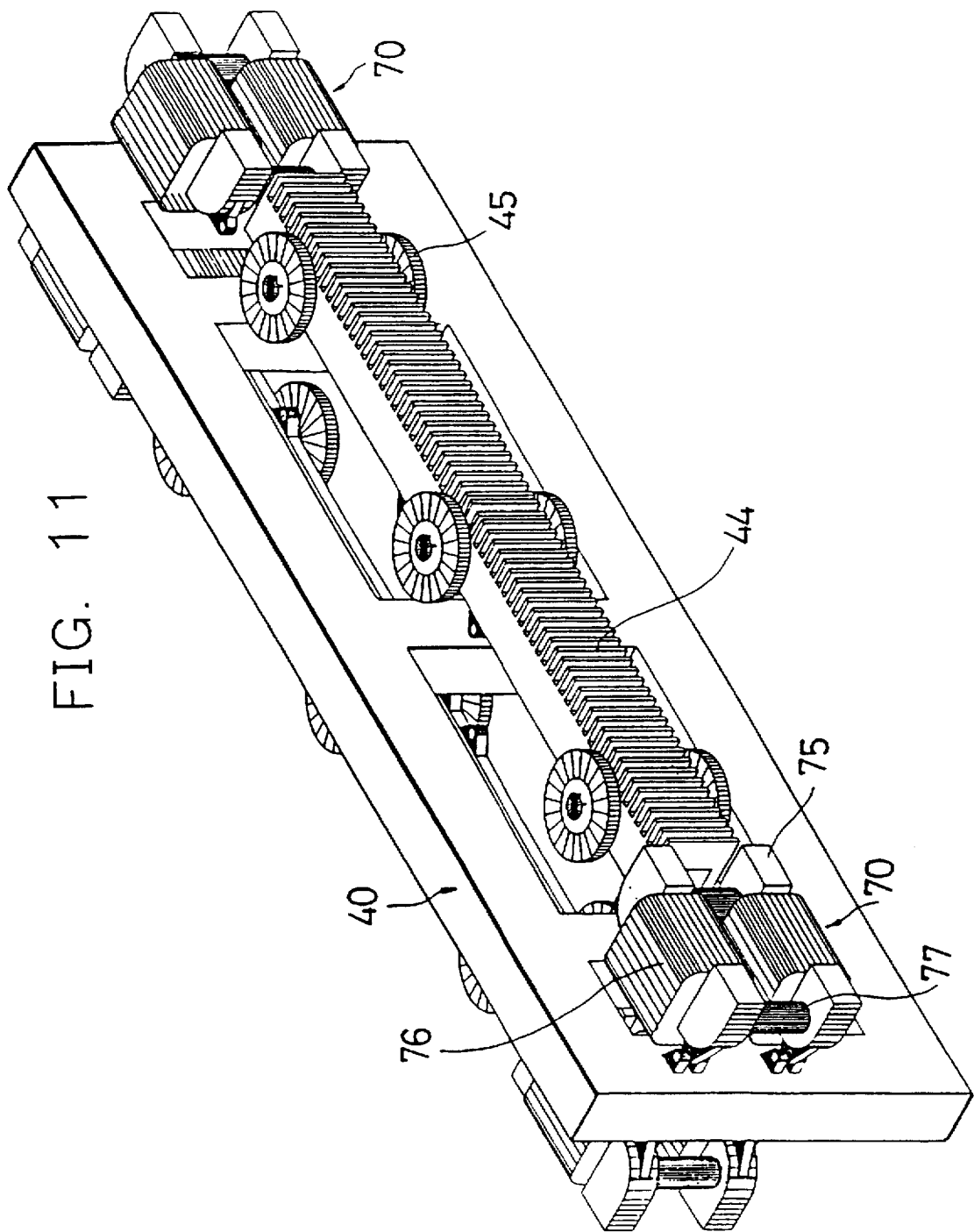
FIG. 11 is a cut-away perspective view illustrating a linear motor and an electromagnetic switch section applied to a switch system for personal rapid transit in accordance with the present invention.

FIG. 11 is a cut-away perspective view illustrating an electromagnetic switch section applied to a switch system. The vehicle chassis 40 is fitted with two electromagnetic switches 70 on each side. Each switch 70 consists of two "U" shaped armature cores 75 and copper wire windings 76 arranged around the center of the "U". The armature cores 75 are joined together by tubular steel connectors 77 at each end so that the two armature cores 75 operate as a unit, however each armature is powered independently so that the failure of one magnet ciruit will not affect the operation of the other magnet. The vehicle 30 can operate safely with one switch magnet core out of order, since the remaining cores in the switch magnet and the other magnetic switch can exert a switching force of 3000 kg. If two magnetic cores go out of order, the vehicle can be switched at reduced speed. The armature cores 75 of the electromagnetic switch 70 are located at the top and bottom edges of the reaction rail 22 so that the magnetic flux passes through the steel box reaction rail 22. Webs of the reaction rail 22 are made 50 mm thick through the switch section to provide a path for the magnetic flux. The aluminum reaction plate 24 embeded in the reaction rail 22 lies between the pole faces of the switches 70 (FIG. 5) and does not affect the electromagnetic efficiency of the switch 70. The inner ends of the electromagnetic switch 70 are mounted on the armatures of the linear motor 44 so that the switches 70 are articulated with the linear motors 44. The gap maintenance wheels 45 on the linear motors 44 ensure that a gap of about 10 mm is maintained between the pole face of the switch 70 and the reaction rails 22. The gap maintenance wheels 45 of the linear motors 44 run on the steel surfaces of the reaction rail 22 on either side of the aluminum reaction plate 24 (refer to FIG. 9).

Figure 12:
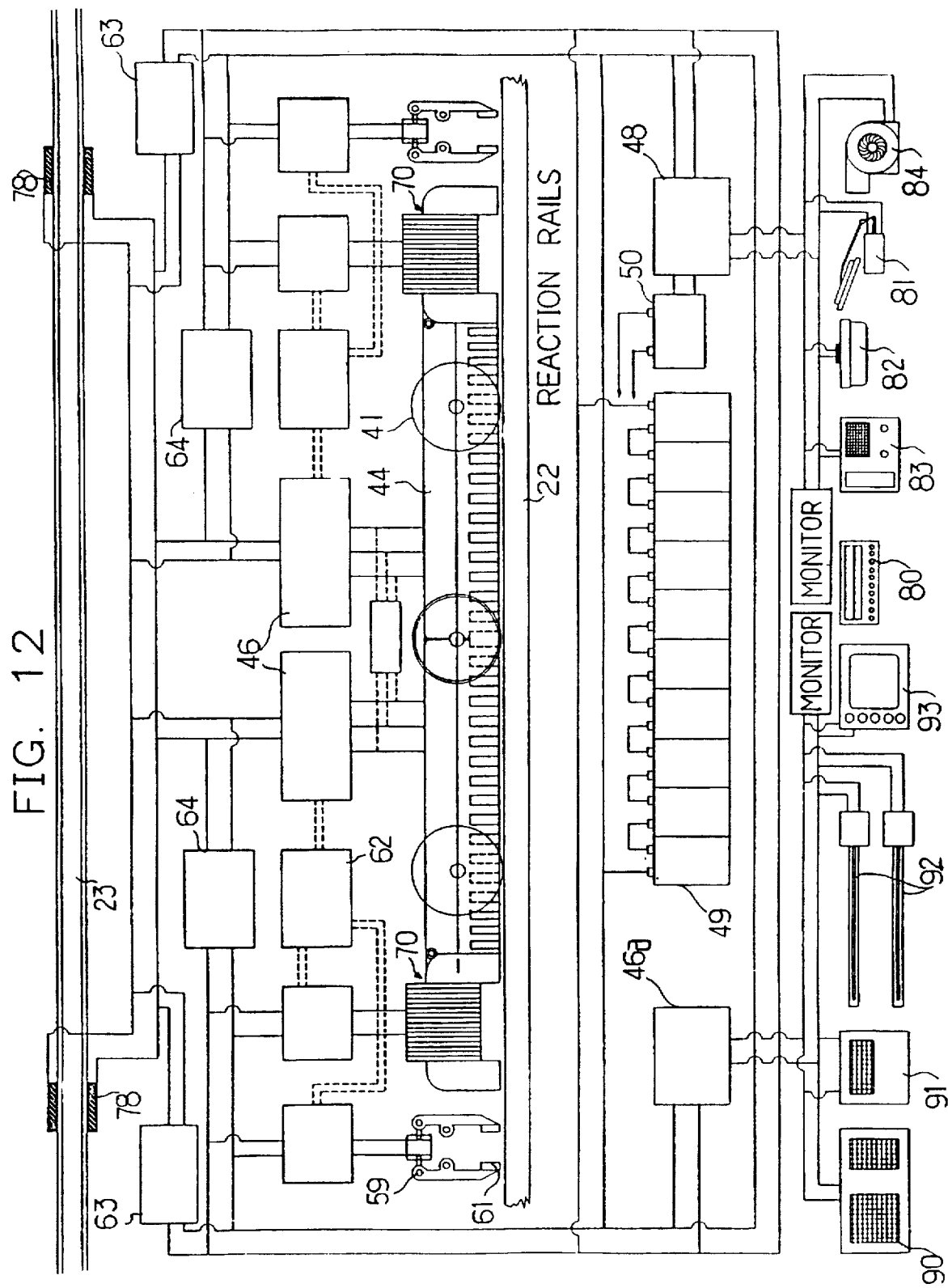
FIG. 12 is a diagram illustrating an electric power system of a switch system for personal rapid transit in accordance with the present invention.

FIG. 12 is a diagram illustrating an electric power system of the switch system for personal rapid transit in accordance with the present invention. Power is supplied to the power supply rails 23 of the guideway 10 at 600 VDC, and collected by the power collection shoes 78 of the vehicle 30. The 600 VDC power goes to duplicate VVVF inverters 46 where it is converted to 400 VAC-3 phase. The control computer 62 of the vehicle 30 governs the performance of the VVVF by varying the voltage, frequency and phase of the inverter 46 to provide the correct linear motor 44 thrust in either direction. The 600 VDC power also goes to duplicate transformers 63 where it is converted to 240 VDC. The 24 VDC power is supplied to the electromagnetic switches 70 and the controller of the emergency/parking brakes 59. The 240 VDC supply goes to a converter 48 where it is converted to 12VDC, and to an inverter 46a where it is converted to 220 VAC. The 12 VDC power supply runs a variety of equipments on the vehicle 30 including a 12 volt battery charger 50, radio 80, windshield wiper 81, interior lights 82, inter-com phone 83 and a ventilator 84. The 220 VAC power supply runs a variety of equipments on the vehicle including the air conditioner 90, heater/ventilator 91, door openers 92, and TV information system 93. The vehicle 30 carries twenty 12 volt batteries 49 which are connected in series to provide a back-up source of 240 VDC. These batteries are kept fully charged by the 12 volt battery charger 50. The batteries supply 240 VDC to duplicate booster units 64 which convert the 24 VDC to 600 VDC. This back-up power supply is activated in the event of a disruption to the main 600 VDC power supply from the power supply rails 23 of the guideway 10. The batteries 49 also provide an emergency supply of 240 VDC power to the electromagnetic switches 70, emergency/parking brakes 59, 240 VDC/220 VAC inverter 46a and 240 VDC/12 VDC converter 48. The batteries 49 have enough capacity to operate the vehicle 30 for 5 km which is enough to take it to the nearest maintenance depot. The Batteries 49 may be Nickel-Zinc or Nickel-Metal Hydride or Lithium type or any other source which provides high capacity with low weight.

FIGS. 13A and 13B are schematic diagrams illustrating the sequence of diverging and merging operations in a switch section. Switching performance of vehicles at a diverging point and a merging point in the switch system will be detailedly described in conduction with the drawing.
<Diverge Sequence>

FIG. 13A shows that the vehicle 30 is switched to either path at a diverging point of the guideway 10. In the diverging operation sequence, the vehicle's direction of travel is programmed into the vehicle computer so that the vehicle 30 knows whether to turn left or right at the switch section S. The guideway 10 is equipped with a signalling system which will notify the direction of the diverging guideway to the vehichle's computer controller. If the vehicle 30 which travels on the straight main path 10a of the guideway 10 is switched to the right direction, at a point 25 meters before the switch point P1 the vehicle 30 proceeds into the switch section S as the electromagnetic switches 70 on the right side of the vehicle 30 (black-colored parts in the drawing) are activated. That is, when the vehicle 30 travels on the main path 10a, the vehicle 30 travels at a high speed only by propulsion force of the right hand side linear motors 44 lest the electromagnetic normal force of the linear motor on the left hand side should affect the reaction rails 22. Once the vehicle 30 passes through the switch point P1, the current is supplied to just the electromagnetic switch 70 located at the right of the vehicle 30. Thus, the electromagnetic switch 70 has a magnetic field phenomenon, and then this holds the vehicle 30 in a close contact with the right of the guideway 10. Accordigly, the vehicle 30 automatically proceeds into a diverging path 10c of the "R" direction shown in FIG. 13A. Once the vehicle 30 passes a transition section S1 of about 5 m long where is smoothly tapered to the diverging path 10c and again goes into the main path, the current supplied to the electromagnetic switch 70 on the right side turns off. The vehicle 30 travels only by propulsion force of the linear motor 44. This operation will be repeated whenever the vehicle travels via the diverging paths 10b and 10c of the switch section. It has been illustrated only that the vehicle 30 is switched to the diverging path 10c on the right side, and an operation, explanation to the left will be omitted due to the same performance as the right.

<Marge Sequence>

FIG. 13B shows that the vehicle 30 is switched from either path at a merging point of the guideway 10. In the merging operation sequence, the vehicle's direction of travel is programmed into the vehicle computer. The guideway 10 is equipped with a signalling system which will notify the direction of the merging guideway. If the vehicle 30 proceeds into a merging section S' of the guideway 10 via the "R" direction from the right diverging path 10c, at a point of about 30 meters before a merging point P2, the electromagnetic switches 70 on the right side (black-colored parts in the drawing) are activated. The electromagnetic switch 70 generates a magnetic force which holds the vehicle against tie right hand side of the guideway. When the vehicle 30 passes the tapered section at 5 m before a merging point P2 of the guideway 10, the vehicle 30 swiftly proceeds into the merging section S' in a smooth contact with the right hand guideway. Once the vehicle 30 entered the merging section S' goes into the main path 10a through a second transition section S2' where contact surfaces of the guideway 10 are slowly tapered, the current supplied to the electromagnetic switch 70 on the right side is turned off, and the vehicle 30 quickly travels only bid propulsion force of the linear motors 44 along the guideway 10. The normal attractive force generated by the linear motor propelling the vehicle through the switch also acts to force the vehicle against the guideway wall. This operation will be repeatedly performed whenever the vehicle 30 passes through the merging section. Here, it has been illustrated only that the vehicle 30 proceeds from the diverging path 10c on the right side to the merging section S', and an operation explanation from the diverging path 10b on the left side to the "L" direction will be omitted due to the same performance as the right.

<Failure Management Strategy>

If one of the four electromagnetic switches 70 failed to activate, the vehicle 30 would continue through the switch to the passenger's destination station, after which the vehicle 30 would be directed to the maintenance depot for repair. If two of the four electromagnetic switches 70 failed to activate, the vehicle 30 would continue to the nearest station where the passenger would be requested to disembark. The vehicle 30 would be then directed to proceed directly to the maintenance depot for repair. In the event of a complete power failure, the vehicle can be propelled and switched from the batteries.

Industrial Applicability

As described above, the present invention allows the vehicle to be fully automated and run into a predetermined direction at fractional second headways by switching means attached to the vehicle chassis when the vehicle passes through the switch section on the guideway, i.e., the diverging point and the merging point of the guideway. Accordingly, the present invention has effects that prevent the vehicle's derailment from the guideway and requires a very small time interval between successive vehicles transferring from one guideway path to another, compared with the conventional device to alter directly the guideway paths for vehicle's direction of travel. This switching ability makes the personal rapid transit technology feasible. The PRT can be used to transport passengers and freight of many types.

What is claimed is:

1. A transportation system for Personal Rapid Transit (PRT) comprising a vehicle operating over a network of interconnected guideways and a switch system, the switch system comprising:

a guideway switch section comprising a main path and first and second diverging paths which extend from said main path to merge and diverge therefrom, said guideway defining a predetermined vacancy, longitudinal guidance and support rails, lateral frames installed on said longitudinal guidance and support rails, a longitudinal slot centrally located on a top side of said guideway so that a support member connecting said chassis and the vehicle can pass through the slot, the longitudinal slot being continuous from said main path to both said diverging paths, and first and second opposed reaction rails mounted to opposed inside surfaces of said guideway switch section, said first reaction rail being functionally continuous from said main path to said first diverging path and said second reaction rail being functionally continuous from said main path to said second diverging path;

a chassis for supporting a vehicle on-board portion located above the chassis, the chassis equipped with guidance wheels inserted into the vacancy defined by the guideway on which the vehicle runs and having an upper portion for supporting the on-board portion of the vehicle; and first and second opposed laterally directed electromagnets arranged at a respective predetermined location of said vehicle chassis, said electromagnets provided solely for directing said vehicle into a predetermined path, along said main path and one of said diverging paths, at said switch section by exerting a respective magnetic force directly on the respective reaction rail functionally continuous from said main path to said one diverging path.

2. The transportation system as claimed in claim 1, further comprising a motor attached to said chassis, and located within said guideway, to propel said vehicle, wherein said electromagnets do not drive said motor, wherein said electromagnets are DC powered electromagnets, and wherein said electromagnets react against the outer edges of the respective reaction rail.

3. The transportation system as claimed in claim 1, wherein said electromagnets comprise magnet cores and winding coils on the core, and are installed at least at four positions to provide an attraction force toward the reaction rail in the guideway during power service; and further comprising opposed linear motors mounted to said chassis for exerting thrust for propulsion and braking on said vehicle chassis by an induced propulsion force against the reaction rails, said linear motor comprising a controller, and further comprising gap maintenance wheels mounted to said motor, wherein each said electromagnet is respectively mounted to one said linear motor.

4. The transportation system as claimed in claim 3, wherein said linear motors are respectively mounted on opposed sides of said chassis in a position which opposes said reaction rail respectively, said linear motors generating a magnetic force which can be used to augment the magnetic force generated by said electromagnets.

5. The transportation system as claimed in claim 3, wherein each said linear motor has an armature and said gap maintenance wheels are respectively mounted on said armature of said respective linear motor as to run on upper and lower edges of said respective reaction rail to prevent a contact between said respective linear motor and said respective reaction rail.

6. The transportation system as claimed in claim 3, further comprising a computerized vehicle control system mounted on said vehicle chassis for controlling vehicle speed and for switching off said linear motor on a non-engaging side of said chassis.

7. The transportation system as claimed in claim 3, wherein said gap maintenance wheels maintain a certain interval between the electromagnets and the reaction rails, the motor mounted gap maintenance wheels are laterally oriented to provide a constant gap between the face of the electromagnet and the reaction rail at a respective one pole face of the magnet, while the chassis mounted guidance wheels are laterally oriented to provide a constant gap between another respective pole face of the electromagnet and the reaction rail, thereby maintaining gap equilibrium at both pole faces of the respective electromagnet as the vehicle passes through a curved section of the guideway.

8. The transportation system as claimed in claim 1, wherein said electromagnets are designed to operate redundantly with a failure monitoring system and a failure management control computer on board the vehicle if there is a failure of any one of said electromagnets.

9. The transportation system as claimed in claim 1, wherein said guideway defines inner walls and said reaction rail is fitted to each inner wall of said guideway at a position between an upper guidance angle and a lower guidance angle of said guideway, said longitudinal guidance and support rails comprising upper and lower lateral guidance rails, said guideway mounted reaction rail being located between the upper and lower lateral guidance rails.

10. The transportation system as claimed in claim 1, wherein said reaction rail is made thicker over a length of said switch section to provide a magnetic flux path for said electromagnets.

11. The transportation system as claimed in claim 1, wherein said electromagnets are mounted in pairs at front-left, front-right, rear-left, and rear-right sides of said chassis.

12. The transportation system as claimed in claim 1, wherein said electromagnets are axially aligned opposite said reaction rail on a lateral axis occupied by said guidance wheels, said electromagnets and reaction rail being aligned horizontally.

13. The transportation system as claimed in claim 1, further comprising an adjustment means for maintaining a gap between said electromagnets and said reaction rail.

14. The transportation system as claimed in claim 1, wherein said electromagnets are flexibly mounted onto said chassis to permit an angular rotation of said electromagnets, and to maintain a consistent electromagnetic force between said electromagnets and said reaction rail.

15. The transportation system as claimed in claim 1, wherein said electromagnets comprise armatures and said armatures comprise a set of wire winding arranged to maximize an electromagnetic force between said electromagnets and said reaction rail, and further comprising a computer controller for activating said electromagnets to attract said respective reaction rail of said predetermined path and for deactivating said activated electromagnets after the chassis passes through a portion of said guideway where said main path meets said diverging paths.

16. The transportation system as claimed in claim 1, wherein said electromagnets are arranged such that a failure of one of said electromagnets will not affect an operation of another of said electromagnets.

17. The transportation system as claimed in claim 1, further comprising a failure management control computer and a failure monitoring system to measure and monitor said electromagnets for functional efficiency and continuity of operation, and automatically send a failure signal to said failure management control computer if a failure occurs.

18. The transportation system as claimed in claim 17, wherein said failure management control computer diverts the vehicle to a maintenance depot after receiving the failure signal from said failure monitoring system.

* * * * *